June 11, 1968 R. B. SCHRECONGOST 3,387,527

ALL HARMONIC WAVE FREQUENCY DIVIDER

Filed May 14, 1965

Inventor:
Ray B. Schrecongost
By
Gradolph, Love & Rogers
Att'ys

1

3,387,527
ALL HARMONIC WAVE FREQUENCY DIVIDER

Ray B. Schrecongost, Park Ridge, Ill., assignor to Hammond Corporation, a corporation of Delaware
Filed May 14, 1965, Ser. No. 455,820
12 Claims. (Cl. 84—1.01)

ABSTRACT OF THE DISCLOSURE

An electric musical instrument frequency divider of the flip-flop bistable type for use at a single frequency, in which the input of each stage is connected to the output of the other through a series capacitor in parallel with a resistor, and in which the capacitor connecting the output of the first stage to the input of the second stage is several times as large as the other capacitor, of the order of at least three times as large, such that at the particular frequency, the waveform at the input to the second stage has a high order of both even and odd harmonics.

The present invention relates primarily to electrical musical instruments, electric organs for instance, and is concerned with the generation of musical tone signals. In such instruments there must be present in some form a source for each tone frequency the instrument is called upon to play. In the past, many schemes have been devised for accomplishing this, including the use of individual electronic oscillators, one for each note, rotating tone wheels, photoelectric scanning systems, and so on.

One system which is coming into more and more prominence in recent years is based upon the use of individual oscillators of one type or another for generating all of the tone signals for the highest octave of notes. Frequency dividers are then used to divide each of these tone signal frequencies by two to give the tone signals for the next lower octave. A second set of frequency dividers is then connected to the outputs of the first set to give the next lower octave, and so on until the full complement of tone signals is provided.

The primary purpose of this invention is to provide novel low cost circuitry for frequency dividers suitable for this type service.

In general, two classes of circuits have been used for frequency division for this purpose. One of these, commonly called a blocking oscillator, is essentially an oscillator having a nominal frequency of oscillation of about half the frequency of the higher octave tone signal it is to divide. A pulse from the higher octave is then connected to lock in or trigger the blocking oscillator, so that it oscillates at exactly the proper frequency. The other type circuits commonly used is basically an Eccles Jordan bistable flip-flop which simply divides the input signal by two.

As between these types of dividers, the blocking oscillator has the disadvantage of requiring adjusting to a nominal frequency close enough to the required output frequency to insure that it will lock in and operate reliably. In general, it may be said that blocking oscillators are less reliable in operation, particularly over extended periods where there may be some drift in the values of the circuit constants. Such circuits are also likely to become somewhat unreliable with voltage variations or swings in ambient temperature, particularly if transistors are used. These difficulties can, to a large extent, be overcome, but only at a cost which is relatively high as compared with flip-flops, and relative cost is an important consideration, because a single organ will contain a large number of frequency dividers (one for every note the organ is capable of rendering, less the notes in the top octave).

2

The flip-flop type dividers, therefore, have an important economic advantage and are more reliable, but they have the disadvantage as ordinarily constructed of having a rectangular wave output giving a hollow clarinet-like sound.

Since a rectangular wave contains only the fundamental and odd harmonics, it is not very useful as a musical tone signal source. In general, it is monotonous, and difficulties arise when the fundamental signal is combined with higher octave signals for the purpose of obtaining the missing even harmonics. Problems are encountered with contamination of the sources with unwanted subharmonics, and contact sequencing effects, for example, when the effort is made to get the various types of sounds necessary to give the organ a reasonable complement of resources. The sawtooth wave, which contains a full complement of both odd and even harmonics is more useful and is much easier to modify to give the other required tones, and therefore is much to be preferred as the basic tone source.

In general, a full harmonic, non-symmetrical wave can have a sawtooth waveform on an oscilloscope; that is, it is almost vertical at one side and tapers off at a relatively constant rate at the other. It should be understood, however, that this is an idealization, and that as a practical matter some deviation from this ideal is possible before much, if any, difference in sound or in general usefulness of the tone source will be noted.

In view of the above, it is an object of this invention to provide a novel flip-flop type frequency divider which has an all harmonic output with a full complement of both even and odd harmonics.

An additional object is to provide a novel low-cost frequency divider having an all harmonic output.

Still another object is to provide several novel and related circuits of this character which give outputs having wave forms of a related nature. In general, the circuits giving the better wave forms are somewhat more expensive, and the choice of circuit, therefore, will depend to a large extent upon what is believed to be a reasonable cost for providing the frequency dividers in a particular organ.

Another object is to provide a novel circuit of this type having little or no D.C. component associated with the output tone signal.

Other objects and advantages will become apparent from the following description of a preferred embodiment of the invention which is illustrated in the accompanying drawings.

In the drawings in which similar characters of reference refer to similar elements throughout the several views.

Figure 1:
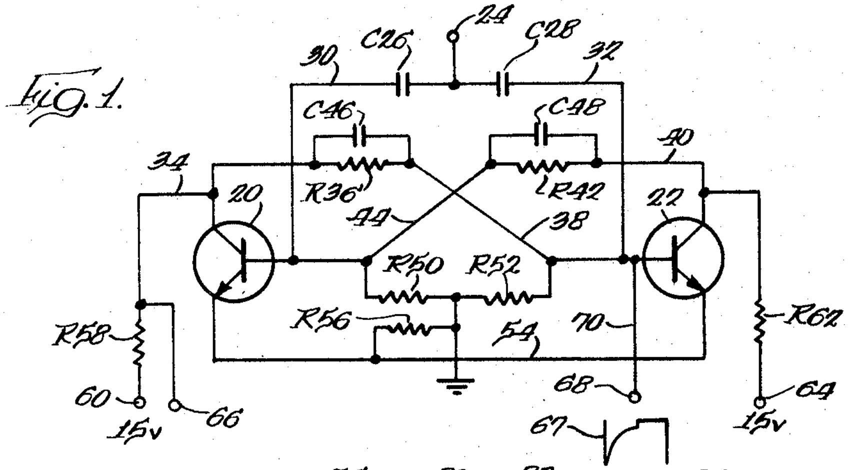
FIG. 1 is an electrical diagram illustrating the basic form the invention may take.

Referring to FIG. 1, which illustrates a basic embodiment of the invention, it will be seen that the circuit is of flip-flop configuration. It consists, as shown, of a pair of NPN transistors 20 and 22 connected as follows. The input A.C. signal is supplied to a terminal 24 which is connected through capacitors C26 and C28 and leads 30 and 32 respectively to the bases of transistors 20 and 22 respectively. The collector of transistor 20 is connected by lead 34, resistor R36, and lead 38 to the base of transistor 22. Similarly, the collector of transistor 22 is connected by lead 40, resistor R42 and lead 44 to the base of transistor 20. Capacitors C46 and C48 are connected respectively across resistors R36 and R42. The base of transistor 20 is also connected to the base of transistor 22 by resistors R50 and R52 in series and the common point between these resistors is grounded. The emitters are connected together by lead 54 and this lead is in turn connected to ground through resistor R56. The collector of transistor 20 is connected through resistor R58 to a 15 v. source represented by the terminal 60, and the collector of transistor 22 is similarly connected through resistor R62 to a 15 v. source 64. The output signal to drive the next frequency divider in the series is taken from a terminal 66 connected to the collector of transistor 20, whereas the output for the bright wave musical tone signal 67 is taken from the base of transistor 22 by way of terminal 68 connected thereto by lead 70.

Figure 2:
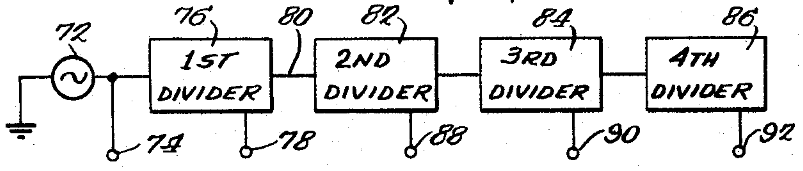
FIG. 2 is a diagram illustrating a typical embodiment of frequency dividers, such as the basic circuit of FIG. 1, in an electric organ tone signal supply system.

A typical organization of the circuit of FIG. 1 into a multioctave musical instrument is shown in FIG. 2. Such an instrument has a group of oscillators 72 of any well known type which generate the highest frequencies. Ordinarily there will be twelve of these to generate the twelve notes for the top octave, but in the interest of simplification only one is shown. The output musical signal from the oscillator 72 appears at terminal 74 and this signal is also supplied to the first frequency divider at 76 which may be the equivalent circuit of FIG. 1, the signal from the oscillator being supplied to the input terminal 24 thereof.

The frequency divider 76 supplies an output musical signal one octave lower than the signal from the oscillator 72 at the terminal 78, which is equivalent to the terminal 68 of FIG. 1. Also, it supplies a signal at the terminal 66 of FIG. 1 which is connected through lead 80 to drive the next frequency divider stage at 82, input to this stage being the equivalent of terminal 24 of FIG. 1, and so on. For purpose of illustration, two more frequency dividers are shown, the third and fourth frequency dividers being indicated respectively by the numerals 84 and 86, and the musical signal outputs from the dividers 82, 84, and 86 being indicated respectively by the numerals 88, 90, and 92.

All of the frequency dividers 76, 82, 84, and 86 may be similar, but certain adjustments are needed to keep the musical output signals well related in wave shape at the different frequencies. In the specific circuit shown, silicon planar transistors (type 2N2712) are used, and the following circuit constants may be used in all stages: R36 and R42, 82K; R50 and R52, 18K; R58 and R62, 15K; R56, 470 ohms; C26 and C28, 390 pf. C46 and C48 will vary somewhat, so values for these are set out in a table below, based upon the assumption that the oscillators 72 operate within the frequency range of from 1,109 c.p.s. to 2,093 c.p.s.

| Output frequency, c.p.s. | C46 (μf.) | C48 (pf.) |
|---|---|---|
| 1st divider: | | |
| 780–1,050 | .012 | (1) |
| 550–750 | .018 | (1) |
| 2d divider: | | |
| 390–525 | .022 | 700 |
| 275–375 | .033 | 700 |
| 3d divider: | | |
| 190–265 | .047 | 700 |
| 140–180 | .068 | 700 |
| 4th divider: | | |
| 95–135 | .100 | 700 |
| 70–90 | .140 | 700 |

[1] .002 μf.

From the above table it is apparent that the same circuit constants have been used for the dividers over a six note range. Actually this can be stretched considerably without appreciable degradation, but half an octave for each group is a convenient bracket. Theoretically, it would be better to interpolate the values so that they would differ slightly for each note, but this is of no practical importance. In this connection it should be appreciated that the reason for using the different values is not because reliability of operation requires it, but because it is necessary to obtain substantially the same harmonic content for the tone signals at the different frequencies.

Note particularly from the table that for each frequency group the value of capacitor C46 is several times the value of capacitor C48. Approximately, C46 in μf. in this particular circuit can be considered to be 10 divided by the frequency in c.p.s., or, as more properly understood, the time constant TC times the frequency can be expressed as a constant TCf which should be about 150K. For example, where the effective resistance in 15K (R36 and R52 in parallel), the capacity should be about .01 μf. at 1,000 c.p.s. Another way of saying this, which is perhaps more expressive of what is desired, is that the time it takes the charge on the large capacitor to decay substantially fully is equivalent approximately to half of a cycle at the output frequency, whereas the small capacitor can have its usual small value which is determined on the basis of whatever minimum capacity is necessary to produce reliable bistable flip-flop action, considering the parameters of the circuit. Adjustments can, of course, be made to use standard values in most instances. For instance, as a practical matter, the value used for the 70–90 c.p.s. divider probably would be .150 rather than .140 μf., as shown. If these were conventional flip-flop dividers, the values of C46 and C48 would be the same, approximately 700 pf., and a rectangular wave output with substantially no even harmonics would result. It has been found, however, that by increasing the value of the cross coupling capacitor C46 to the amount indicated, the waveform at the base of transistor 22 is about as illustrated at 94 adjacent the termianl 68 of FIG. 1.

Incidentally, the capacitors C48 for the first stage dividers are larger than the others; this is for the purpose of matching the first dividers to the characteristics of the particular oscillators and is incidental to the present invention, which is concerned primarily with the capacitors at C46. Using the formula given, typical values for the harmonic content of this wave as percentage of the amplitude of the fundamental up to the eighth harmonic, with the circuit constants given, are as follows:

| | |
|---|---|
| Subharmonics | .02 |
| Fundamental | 100 |
| Second harmonic | 50 |
| Third harmonic | 50 |
| Fourth harmonic | 28 |
| Fifth harmonic | 32 |
| Sixth harmonic | 20 |
| Seventh harmonic | 23 |
| Eighth harmonic | 15 |

The tone signal from this circuit, therefore, even though the odd harmonics are slightly stronger than the even harmonics, has a good declining series of all harmonics, and is extremely good, considering the low circuit cost.

Reliability and consistency of performance are also very good, since the circuit is stable under rather wide temperature and voltage variation and is not overly sensitive to the values of the circuit constants.

Figure 6:
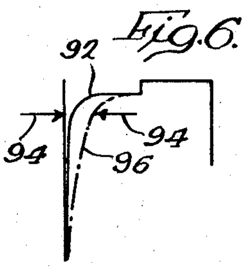
FIG. 6 is a graphic illustration of the approximate effect upon the wave form of a change in the value of one of the components in the circuit of FIG. 1.

What happens in this circuit essentially is that the large capacitor C46 connected to the base of transistor 22 produces an exponential wave form for half the cycle by extending the discharge time of the inactive trigger pulse to that side, while the other half cycle is not appreciably affected. The tone signal output is then taken from the base connected to the large capacitor rather than from the collector as is customary. In FIG. 6 the curve 92 shows approximately the discharge rate when the capacitor at C46 has the usual value of about 700 pf. Between the arrows 94, the time interval is about 50 microseconds. When this capacitor is increased to .002 mf., curve 96 results. The time interval between the arrows 94 now is about 200 microseconds. If C46 is still larger, as in the table, more integration takes place. Almost universally, the capacitor at C46 is kept small so as to make the circuit responsive substantially independently of input frequency. In the present instance, however, where the input frequency is constant and relatively low, the discharge rate can be tailored to fit the desired curve to the known frequency, and for this purpose, in the particular circuit, capacitors at C46 from .012 to .15 μf. are used.

Since the proper value for C46 will depend upon the transistors used and other variables, about the best approach is to increase the value of C46 beyond that used in a conventional flip-flop until the even harmonic content of the output is slightly less than the odd harmonic content thereof as set forth in the table above.

Although the waveform from this circuit is very good, it can be improved at slight additional cost by the introduction of any of several related modifications.

Figure 3:
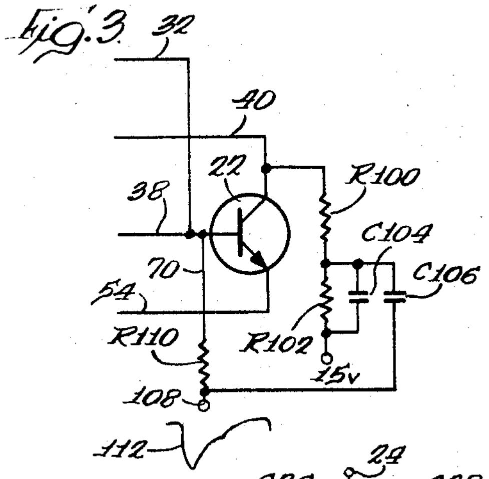
FIG. 3 is a diagram similar to FIG. 1, but showing an alternative form the invention may take.

In FIG. 3 one of these modifications is shown. The principal portion of the circuit is the same as FIG. 1, and therefore need not be repeated. The resistor R62 has, however, been replaced by two resistors R100 and R102 in series, resistor R102 being closer to the 15 v. supply. This resistor, R102, is bridged by capacitor C104, and the junction between resistors R100 and R102 is connected through capacitor C106 to the musical signal output terminal 108 which is the equivalent of terminal 68 of FIG. 1. Terminal 108 is also connected through resistor R110 to be the base lead 70 of FIG. 1. This circuit provides an output waveform of the type illustrated at 112 near terminal 108.

The capacitative coupling of a portion of the square wave at the collector of transistor 22 into a resistive circuit connected at the other end to the base and the integrating circuit R102, C104 produces an integrated rounded sawtooth at an intermediate point which is, of course, fed from both sides.

The circuit of FIG. 4 again is like FIG. 1, except as shown. Here the output music signal terminal 114 is connected through a resistor R116 and capacitor C118 to the collector of transistor 22. Terminal 114 is also connected to the midpoint of a divider consisting of a resistor R120 connected at the other end to the base of transistor 22 and a resistor 122, the other end of which is grounded. Terminal 114 therefore produces an integrated signal, a portion of which is from the base of transistor 22 while another portion is the out of phase signal from the collector of transistor 22. This circuit provides an almost perfect fast rise time integrated sawtooth of the character illustrated at 124. Upon analysis, this wave has substantially the following characteristics:

| | Percent |
|---|---|
| Subharmonics | .02 |
| Fundamental | 100 |
| Second | 55 |
| Third | 34 |
| Fourth | 29 |
| Fifth | 21 |
| Sixth | 20 |
| Seventh | 16 |
| Eighth | 15 |

Figure 4:
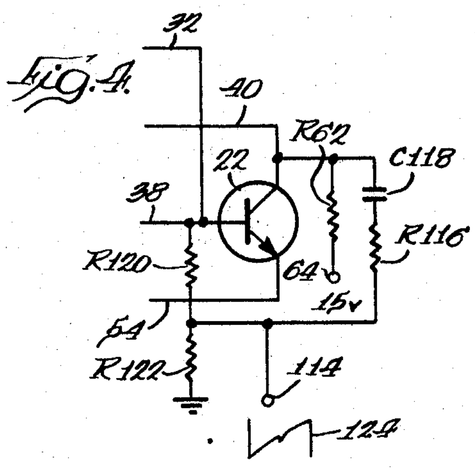
FIG. 4 is a diagram of still another circuit variation embodying the invention.
Figure 5:
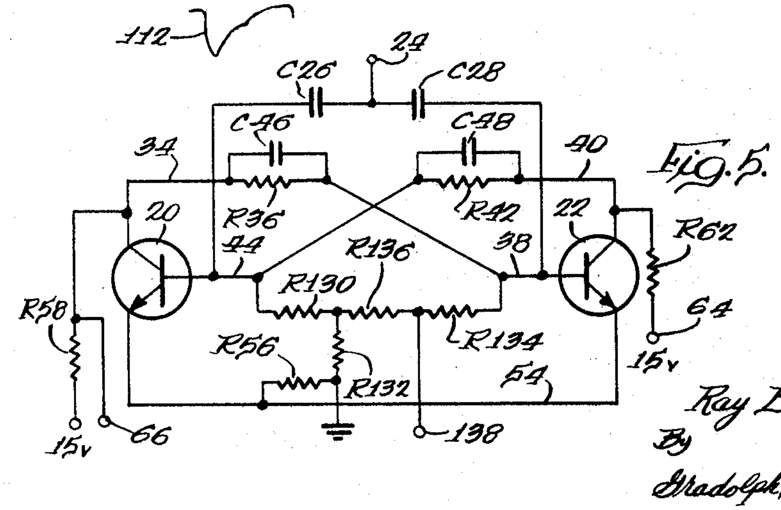
FIG. 5 is still another alternative form for the invention.

The circuit of FIG. 5 is similar to that of FIG. 4 and gives about the same output waveform. It is essentially a development from the system of FIG. 4 and has the advantage of eliminating the necessity for the capacitor C118, but the capacitor C48 in FIG. 5 needs to be larger up to about the value of C46. In general, I prefer the circuit of FIG. 4, particularly if prefabricated modules are used, since C48 in FIGS. 1, 3, and 4 is small enough to be accommodated in the module, whereas C48 in FIG. 5 is too large and needs to be connected separately. In this circuit, resistor R50 of FIG. 1 between the base of transistor 20 and ground is replaced by two resistors R 130 and R132 in series. Similiarly, the resistor R52 of FIG. 1 is replaced by resistor R134 connected to the base of transistor 22, and resistor R136 connected between resistor 134 and the common point between resistors R130 and R132. The signal output terminal 138 is connected to the common point between resistors R134 and R136.

This circuit can have the same characteristics as the circuit of FIG. 4 even though the capacitor C118 of FIG. 4 is omitted, because the connection through R136 and R130 to the base of transistor 20 is equivalent to the connection through C118 to the collector of transistor 22. Looked at another way, the capacitor C48 connects R130 to the collector of transistor 22 and serves as the equivalent of C118 of FIG. 4. Since capacitor C48 serves a dual purpose in this circuit, its value, as mentioned above, should be increased as compared with FIG. 1. Conveniently it can be made the same as C46 which follows the previously set forth schedule, or if desired, it can be somewhat smaller in the interest of cost saving. Its precise value is not particularly critical.

Other values not previously given may be:

| | |
|---|---|
| R100 | 15K. |
| R102 | 10K. |
| R110 | 68K. |
| R130 | 12K. |
| R132 | 8K. |
| R134 | 12K. |
| R136 | 6.8K. |
| R116 | 47K. |
| R120 | 12K. |
| R122 | 6.8K. |
| C104 | .047 μf. |
| C106 | .0022 μf at 300 c.p.s. |
| C118 | 0.12 μf at 300 c.p.s. |

Although circuits in detail have been given to illustrate features of this invention, it will be appreciated that the fundamental thought is to lengthen the discharge time sufficiently on one side at least of a flip-flop circuit so that, although one half of the wave form may remain substantially of square wave configuration, the other half of the wave is a well spread out exponential curve containing almost an even balance of even to odd harmonics, this being accomplished by greatly increasing the capacity in one of the cross coupling branches and taking the signal output from the transistor base connected to the large capacitor. This invention also contemplates improvement of this basic wave form by integrating it with a portion of the out of phase square wave or slightly modified square wave output from the same circuit.

Another feature of value associated with these circuits is that unlike ordinary flip-flops, half of the wave cycle is positive while the other half is negative relative to ground and thus a high level output signal with very little or no residual D.C. potential is feasible. This of course is important when coupling the circuit to associated circuits. In the ordinary flip-flop the output wave is entirely either positive or negative relative to ground and therefore has a strong D.C. component.

Having described my invention, what I claim as new and useful and desire to secure by Letters Patent is:

1. A musical instrument all harmonic wave frequency divider comprising first and second amplifiers, each having an input and an output interconnected to provide a bistable flip-flop including: a circuit having a series capacitor and parallel resistor connecting the input of the first amplifier to the output of the second amplifier, a second circuit having a second series capacitor and parallel resistor connecting the input of the second amplifier to the output of the first amplifier, said second capacitor having a value many times the minimum required value of the first capacitor to produce flip-flop action and sufficient to give a discharge time covering the major portion of a half cycle at the output frequency, and a tone signal output circuit connected to the input of said second amplifier.

2. The frequency divider called for in claim 1 in which the value of said second capacitor is sufficient to produce an even harmonic series substantially as strong as the odd harmonic series.

3. The frequency divider called for in claim 2 including circuit means including a series capacitor connected between said signal output circuit and the output of said second amplifier.

4. A musical instrument all harmonic wave frequency divider comprising first and second transistors, each having an input and an output interconnected to provide a bistable flip-flop including: a circuit having a series capacitor and parallel resistor connecting the input of the first transistor to the output of the second transistor, a second circuit having a second series capacitor and parallel resistor connecting the input of the second transistor to the output of the first transistor, said second capacitor having a value many times the minimum required value of the first capacitor to produce flip-flop action and sufficient to give a discharge time covering the major portion of a half cycle at the output frequency, and a tone signal output circuit connected to the input of said second transistor and the input of said first transistor.

5. A musical instrument all harmonic wave frequency divided comprising first and second transistors, each having base and collector elements interconnected to provide a bistable flip-flop including: a circuit having a series capacitor and parallel resistor connecting the base of the first transistor to the collector of the second transistor, a second circiut having a second series capacitor and parallel resistor connecting the base of the second transistor to the collector of the first transistor, said second capacitor having a value many times the minimum required value of the first capacitor to produce flip-flop action and sufficient to give a discharge time covering the major portion of a half cycle at the output frequency, and a tone signal output circuit connected to the base of said second transistor.

6. The frequency divider called for in claim 5 in which the value of said second capacitor is sufficient to produce a strong even-harmonic content in the output waveform.

7. The frequency divider called for in claim 6 including circuit means including a series capacitor connected between said signal output circuit and the collector of said second transistor.

8. The frequency divider called for in claim 6 in which the signal output circuit is also connected to the base of said first transistor and the value of the first capacitor is larger than the minimum required in the combination of claim 7.

9. The frequency divider called for in claim 6 including circuit means including a series capacitor connected between said signal output circuit and the collector of said second transistor.

10. A musical instrument frequency divider comprising first and second transistors, each having an input and an output interconnected to provide a bistable flip-flop including: a circuit having a series capacitor and parallel resistor connecting the input of the first transistor to the output of the second transistor, a second circuit having a second series capacitor and parallel resistor connecting the input of the second transistor to the output of the first transistor, said second capacitor having a value larger than said first capacitor and large enough to give a strong even-harmonic content to the waveform at the input to the second transistor, and a tone signal output circuit connected to the input of said second transistor.

11. The frequency divider called for in claim 10 including circuit means including a series capacitor connected between said signal output circuit and the output of said second transistor.

12. The frequency divider called for in claim 10 in which the signal output circuit is also connected to the input of said first transistor and the value of the first capacitor is larger than the minimum required in the combination of claim 14.

References Cited

UNITED STATES PATENTS

| | | | |
|---|---|---|---|
| 2,540,478 | 2/1951 | Frost | 331—61 |
| 2,675,476 | 4/1954 | Isberg | 331—60 |
| 3,023,322 | 2/1962 | Keller | 307—88.5 |

ARTHUR GAUSS, *Primary Examiner.*

B. P. DAVIS, *Assistant Examiner.*

UNITED STATES PATENT OFFICE
CERTIFICATE OF CORRECTION

Patent No. 3,387,527 June 11, 1968

Ray B. Schrecongost

It is certified that error appears in the above identified patent and that said Letters Patent are hereby corrected as shown below:

Column 6, line 38, "0.12" should read -- .012 --. Column 7, line 34, "circiut" should read -- circuit --. Column 8, line 9, claim reference numeral "7" should read -- 6 --; line 35, claim reference numeral "14" should read -- 10 --.

Signed and sealed this 14th day of October 1969.

(SEAL)
Attest:

Edward M. Fletcher, Jr.
Attesting Officer

WILLIAM E. SCHUYLER, JR.
Commissioner of Patents